United States Patent [19]

Gilliland et al.

[11] Patent Number: 5,714,819
[45] Date of Patent: Feb. 3, 1998

[54] MOTOR HAVING UNIVERSAL FAN END BRACKET

[75] Inventors: Michael L. Gilliland; Robert A. Ciccarelli, both of Kent; James P. Shawcross, Hudson, all of Ohio

[73] Assignee: Ametek, Inc., Kent, Ohio

[21] Appl. No.: 738,190

[22] Filed: Oct. 28, 1996

[51] Int. Cl.[6] .................................................. H02K 5/20
[52] U.S. Cl. ........................ 310/91; 310/58; 310/60 R; 310/63; 310/89; 417/368; 417/423.14; 415/208.1
[58] Field of Search ........................... 310/58, 60 R, 310/5 G, 62, 63, 91, 53, 59, 89; 417/368, 369, 423.2, 423.14; 415/208.1, 213.1

[56] References Cited

U.S. PATENT DOCUMENTS

| | | | |
|---|---|---|---|
| 993,985 | 5/1911 | Harker | 417/369 |
| 3,477,384 | 11/1969 | Hlinka | 417/368 |
| 3,791,772 | 2/1974 | Keimpema et al. | 417/423.14 |
| 4,111,615 | 9/1978 | Watanabe | 417/423.2 |
| 4,679,990 | 7/1987 | Yamaura et al. | 417/368 |
| 5,110,266 | 5/1992 | Toyoshima et al. | 417/423.2 |
| 5,296,769 | 3/1994 | Havens et al. | 310/90 |
| 5,451,139 | 9/1995 | Tadiello | 415/208.1 |
| 5,454,690 | 10/1995 | Wolfe et al. | 415/208.2 |

Primary Examiner—Thomas M. Dougherty
Assistant Examiner—B. Mullins
Attorney, Agent, or Firm—Renner, Kenner, Greive, Bobak, Taylor & Weber

[57] ABSTRACT

A fan end bracket for a motorized fan assembly has a plurality of curvilinear tapered air passages. Each air passage includes a flow port, such that air being moved by a rotating fan assembly is directed through the air passages and the flow ports. A skeletal motor assembly is affixed to one side of the end bracket such that the motor shaft is disposed through a shaft aperture in the end bracket. A rotating fan member is affixed to the motor shaft adjacent to the other side of the end bracket. A shroud member is provided to shroud the rotating fan member so as to cause the flow of air to be directed through the air passages. A baffle plate is interposed between the rotating fan member and the end bracket. The baffle plate includes a plurality of curvilinear scallops which correspond to the air passages in the end bracket. An effective flow port is created between the scallops of the baffle plate and the tapered ramp surfaces of the end brackets so the size of the effective flow port may be adjusted by merely changing the baffle plate so as to optimize the flow and pressure parameters of the fan for a particular motor size.

20 Claims, 4 Drawing Sheets

MOTOR HAVING UNIVERSAL FAN END BRACKET

TECHNICAL FIELD

The invention herein resides in the art of dynamoelectric machines such as motors and generators. More particularly, the invention relates to a fan end bracket for such motors and generators. Specifically, the invention relates to a universal fan end bracket adapted for use with a wide variety of motor sizes.

BACKGROUND ART

Heretofore, it has been known to use electric motors to drive fans for various air handling or cooling operations. In such motors a fan end bracket is bolted to a cup shaped motor housing in which the motor coils are retained. It has also been known to utilize fan end brackets in conjunction with motors having skeletal frames, which allow for the use of multiple sizes of motors with a single size fan end bracket. More recently, it has been known to use fan end brackets which include air passages for efficiently moving air therethrough. In such end brackets the size of the respective intake and exhaust passages are selected to optimize air flow and air pressure for a particular size motor in a particular application. However, the use of different size motors with a single size end bracket having air passages therein has not been practical because the size of the air passages must be tuned to match the size and speed of the motor. Accordingly, it is most desirable to obtain a universal fan end bracket which is adapted for use with a number of different motor sizes and is capable of being tuned for each particular motor size and application.

DISCLOSURE OF INVENTION

In light of the foregoing, it is an aspect of the invention to provide a fan end bracket for an electric motor assembly.

Another aspect of the invention is the provision of a fan end bracket for a motor assembly having a plurality of air passages therein for optimizing air flow and air pressure.

Yet an additional aspect of the invention is the provision of a fan end bracket which is adapted for use with a number of different motor sizes.

Still another aspect of the invention is the provision of a fan end bracket which is capable of being tuned to optimize air pressure and air flow for a particular motor size and application.

The foregoing and other aspects of the invention which will become apparent as the detailed description proceeds are achieved by a motor assembly having a rotating fan member drivingly connected to a rotor member, the rotor member being disposed within a stator assembly, comprising: a fan end bracket having first and second sides; a plurality of tapered air passages in said first and second sides, each said air passage having a fixed flow port aperture therein; means for mounting the stator assembly on said fan end bracket; means for shrouding the fan member, said means for shrouding being mateably engageable with said fan end bracket; and, means for selectively providing an effective flow port aperture corresponding to each said air passage, said means for selectively providing being interposed between said fan member and said end bracket.

Other aspects of the invention are attained by a baffle plate for a motorized fan assembly having a fan end bracket, the end bracket having a plurality of the tapered air passages defined by a plurality of ramped surfaces and flow ports the baffle plate comprising: an annular disk shaped member having a central shaft aperture therein, and a plurality of the tapered scalloped members located about the outer circumference thereof.

Still other aspects of the invention are attained by a universal fan end bracket assembly for a motorized fan comprising: an end bracket having a first side; a second side opposite said first side; a cylindrical outer wall between said first and said second side, said first and second sides having a central shaft aperature therethrough; a plurality of tapered ramp surfaces radiating outwardly from said central shaft aperture toward said cylindrical outer wall in said first side, said plurality of tapered ramp surfaces defining a plurality of curvilinear air passages; a flow port in each said air passage; and a motor mounting rim on said second side; and, a baffle plate having a plurality of curvilinear scallops therein said baffle plate adapted to be disposed on said first side of said end bracket.

BRIEF DESCRIPTION OF THE DRAWINGS

For a complete understanding of the objects, techniques, and structure of the invention reference should be made to the following detailed description and accompanying drawings, wherein.

BEST MODE FOR CARRYING OUT THE INVENTION

Figure 1:
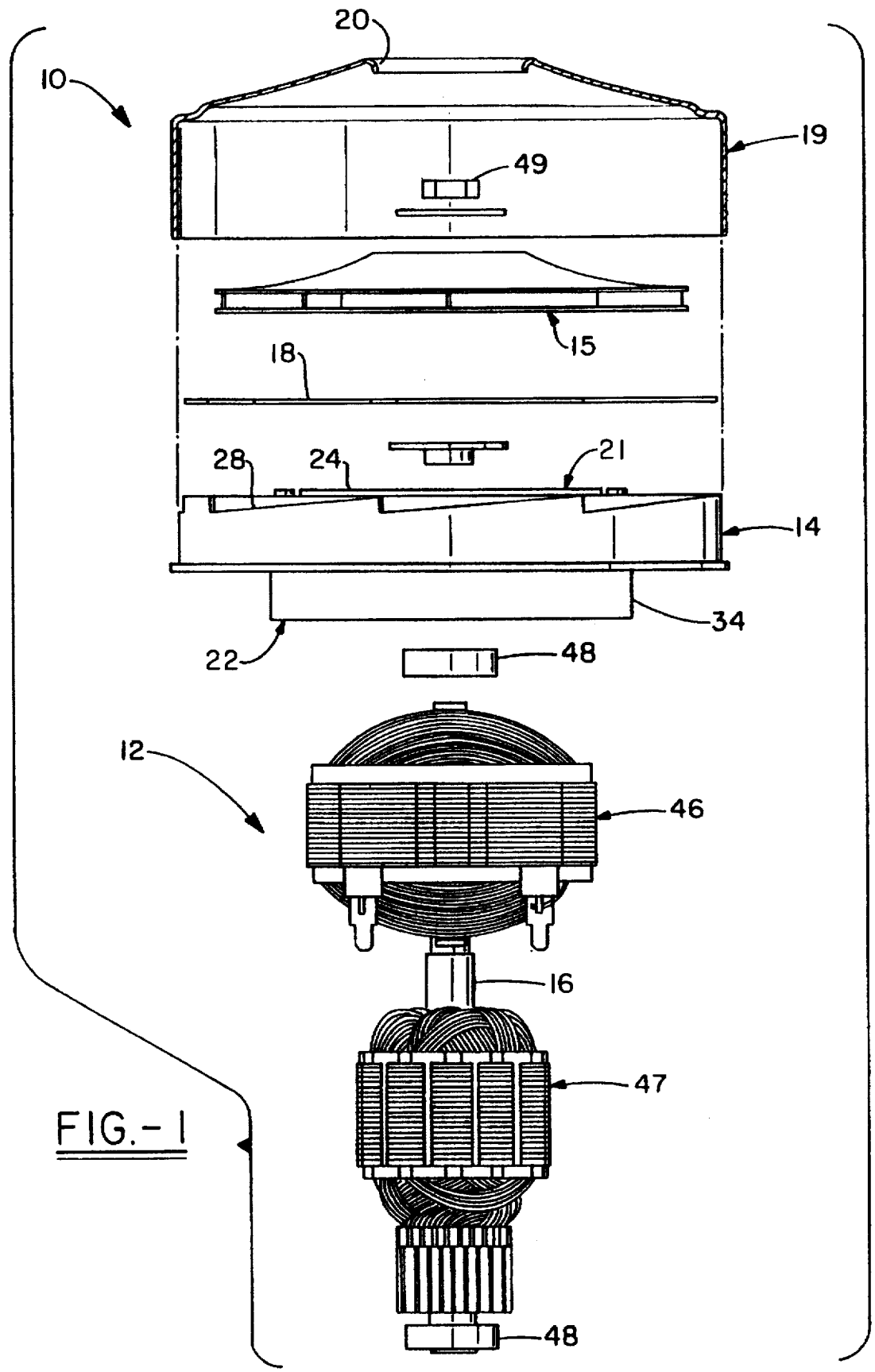
FIG. 1 is an exploded elevational view in partial cross-section of the motor assembly according to the invention.
Figure 2:
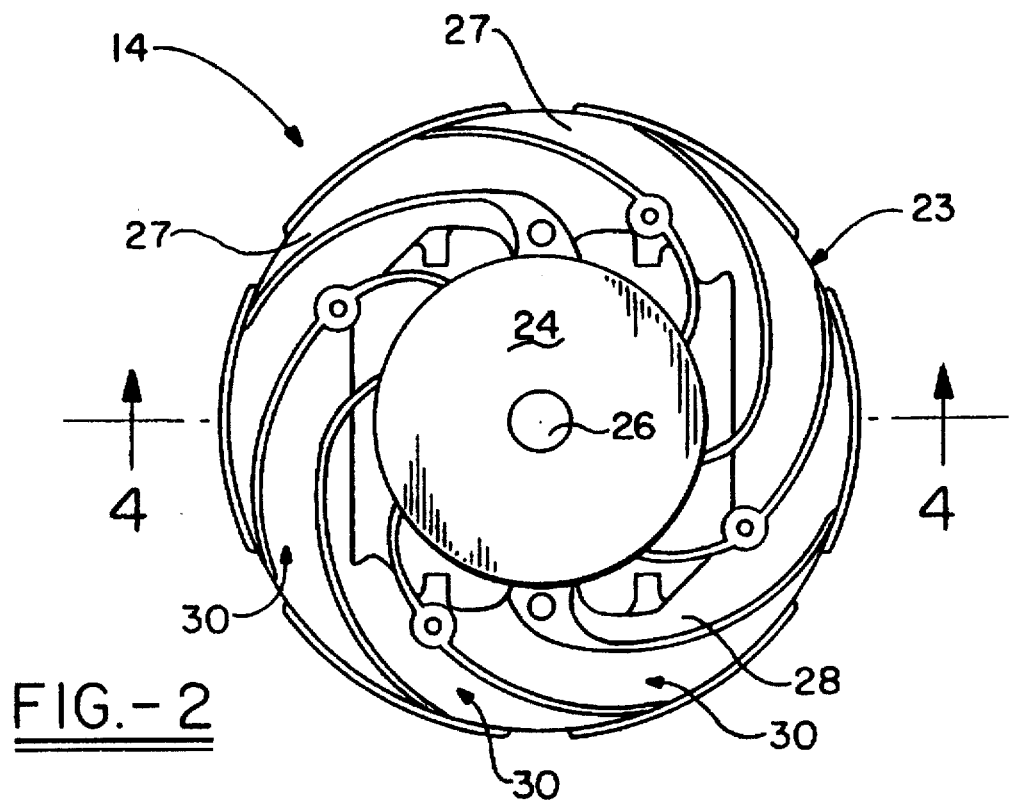
FIG. 2 is a top plan view of the fan end bracket according to the invention.

Referring now to the drawings, it can be seen that a fan end bracket assembly according to the invention is designated generally by the numeral 10. While it will be appreciated that the concept of the invention is applicable to any dynamoelectric device, the description herein will be with respect to a motor assembly of the nature shown. In such a device, a motor assembly 12 is affixed to a generally cylindrical end bracket 14. A rotating fan member 15 is mounted to the motor assembly 12 by way of a shaft 16 which extends through the end bracket 14. A baffle plate 18 is interposed between the rotating fan member 15 and the end bracket 14 for reasons which will become apparent as the description continues. A shroud member 19 is disposed over the rotating fan member 15 and fixedly engages the end bracket 14. The shroud member 19 is cupshaped and has an air-flow opening 20 therethrough.

Referring now to FIGS. 2–5 it can be seen that the end bracket 14 includes a first side 21 and a second side 22. The end bracket 14 further includes a generally cylindrical circumferential outer wall 23. As can be seen, the first side 21 of the end bracket 14 is generally defined by a central fan mounting plane 24 having a central shaft aperture 26 therethrough. A plurality of tapered air passages 27 are disposed in a curved sunburst arrangement radiating from the fan mounting plane 24 outwardly toward the outer wall 23. Each air passage 27 is defined by an upper tapered ramp surface 28, which tapers from the fan mounting plane 24 toward the outer wall 23. At a trailing edge 29 of each air passage 27 is a port aperture 30 which is in communication with the second side 22 of the end bracket 14.

The second side 22 of the end bracket 14 is generally defined by a central bearing mount 31 comprising a cylindrical wall 32 disposed around the shaft aperture 26. A stator mounting rim 34 comprises a wall member 35 extending generally orthogonally from the second side 22 of the end bracket 14. A plurality of air passages 36, which are contiguous with respective air passages 27, are included in the second side 22 of the end bracket 14. The air passages 36 are defined by a plurality of curvilinear passage walls 38 which radiate outwardly from the bearing mount 31 to the stator mounting rim 34.

Figure 6:
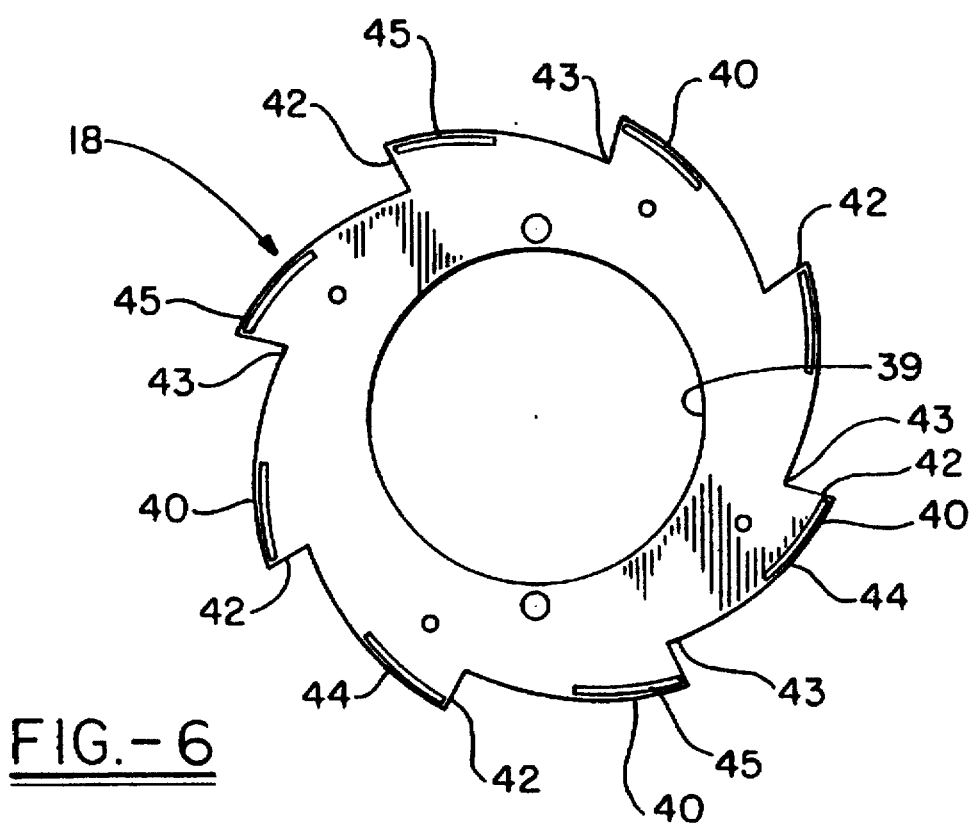
FIG. 6 is a top plan view of the baffle plate according to the invention.
Figure 3:
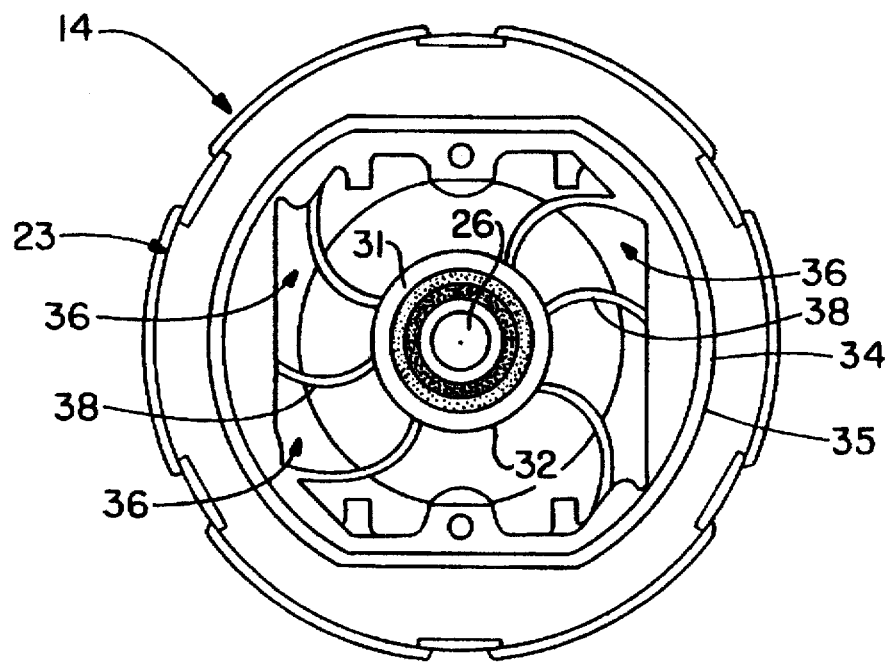
FIG. 3 is a bottom plan view of the fan end bracket according to the invention.
Figure 4:
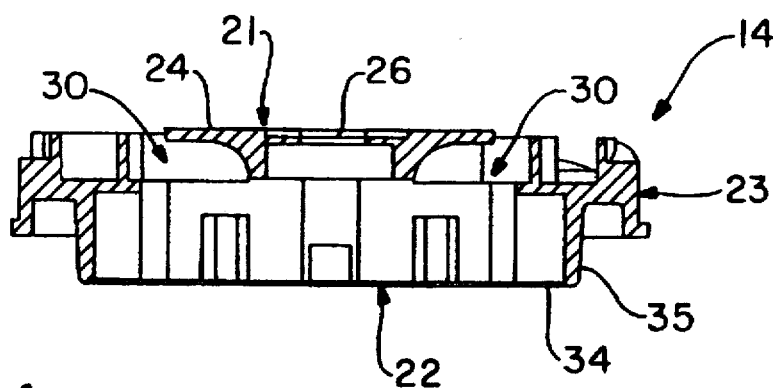
FIG. 4 is a cross sectional view of the fan bracket taken along the line 4—4 of FIG.
Figure 5:
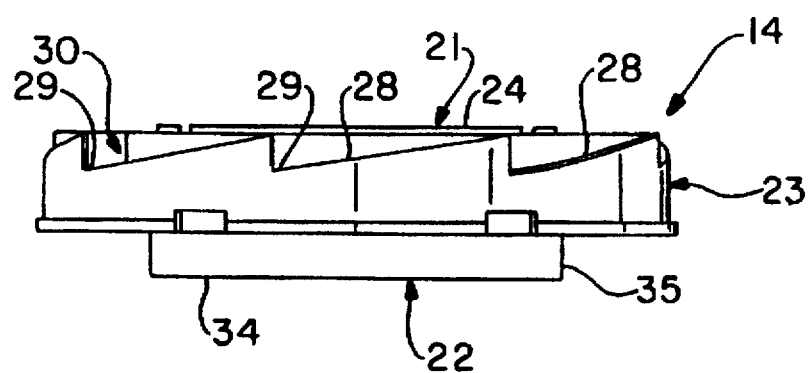
FIG. 5 is an elevational side view of the fan end bracket.
Figure 7:
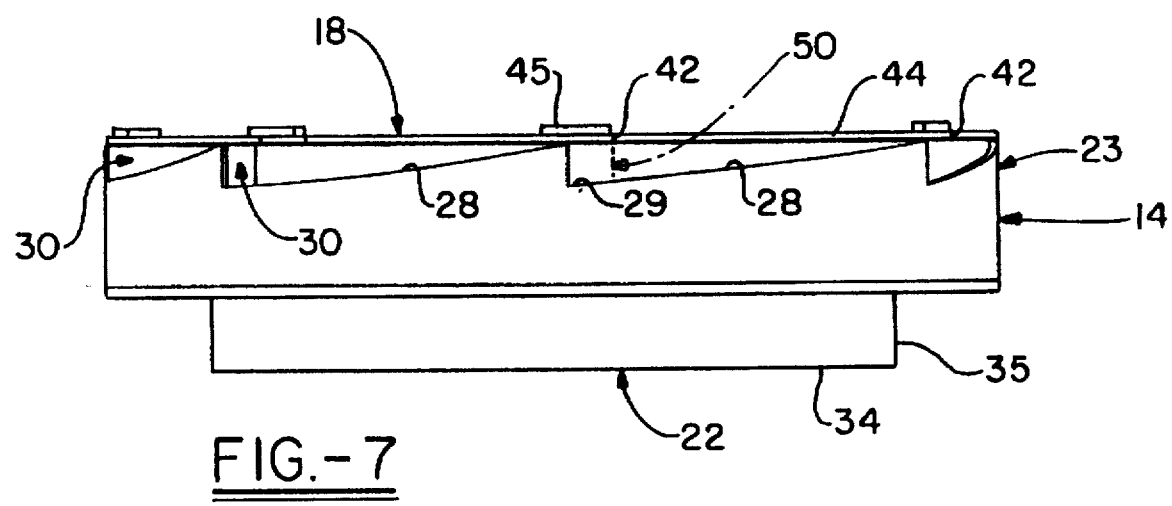
FIG. 7 is an elevational view of the bracket and the baffle plate.

Referring now to FIG. 6, it can be seen that the baffle member 18 comprises a generally annular disk shaped plate having a central aperture 39 therein. As can be seen, the outermost diameter of the baffle member 18 is approximately equal to that of the outer wall 23 of the end bracket 14. It can also be seen that the baffle member 18 is provided with a plurality of scallops 40 about the outer diameter thereof; the number of scallops 40 corresponding to the number of air passages 27 in the end bracket 14. Each scallop 40 is defined by a leading end 42 and a trailing end 43. As shown, the leading end 42 of each scallop 40 begins at the trailing end 43 of a adjacent scallop 40. For reasons which will become apparent as the description continues the curvilinear scallop profile 44 between the leading end 42 and trailing end 43 of each scallop 40 approximates the curvilinear profile of each air passage 27 in the end bracket 14. The dimension of the scallop profile 44 may be adjusted depending upon the desired amount of air flow through the passages 27 and 36. The fan side of the baffle plate may be provided with baffle vanes 45 along the outer periphery of the scallop profile 44. The baffle vanes 45 facilitate the smooth directional flow of air between the fan member 15 and the cylindrical end bracket 14. Of course, the baffle vanes 45 are positioned so as not to interfere with the rotation of the fan member 15.

With reference again to FIG. 1, assembly of the device 10 is accomplished by affixing with mounting screws a stator portion 46 of the motor assembly 12 to the stator mounting rim 34 of the end bracket 14. A rotor portion 47 of the motor assembly 12 is disposed within the stator portion 46 such that the shaft 16 extends through the shaft aperture 26 and is journaled in the bearing mount 31 by way of a bearing 48. The baffle member 18 is disposed adjacent to the fan mounting plane 24 of the end bracket 14 and the rotating fan member 15 is mounted on the shaft 16 by a fastener 49 with a washer disposed therebetween. Assembly of the device 10 is completed by affixing the shroud member 19 to the end bracket 14. The shroud member 19 press fits or frictionally engages the outer wall 23 of the end bracket 14 as shown.

In operation when the fan end bracket 10 is assembled, air is drawn through the opening 20 into the central portion of the fan member 15, whereupon the air is directed radially outward toward the baffle plate 18 and the cylindrical end bracket 14. The rotating fan member 15 directs air through the end bracket 14 by way of the air passages 27. While each air passage 27 includes a fixed port aperture 30, the baffle member 18 is used to produce an effective port aperture 50. The effective port apertures 50 are created between the leading end 42 of the scallops 40 of the baffle 18 and the ramp surfaces 28 of the air passages 27. It should be recognized that the distance between the leading end 42 and ramp surface 28 defines the effective port aperture 50, through which air may travel when moved by the rotating fan member 15. It should also be apparent that the effective port aperture 50 may be selectively increased or decreased in size by shortening or lengthening, respectively, the curvilinear profile 44 of the scallops 40. Accordingly, the amount of air flow and pressure within the end bracket 14 may be selectively controlled by the use of baffle plates 18 having different lengths for the curvilinear profiles 44.

Those skilled in the art will now recognize that a universal fan end bracket has been attained, inasmuch as a single size fan end bracket 14 may be used with a number of motors having different axial length sizes. This is facilitated by the use of motor assemblies having skeletal frames which may be affixed to the end bracket, as opposed to prior end brackets which enclosed the stator assembly. As such, any time a different sized motor assembly is used, only the configuration of the baffle plate 18 needs to be changed, not the entire end bracket assembly. In other words, the use of baffle plates 18 allows the effective ports 50 of the end bracket to be tuned so as to optimize flow and pressure conditions for each motor size without the need for a different end bracket.

Thus it can be seen that the objects of the invention have been satisfied by the structure presented above. While in accordance with the patent statutes, only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A baffle plate for a motorized fan assembly having a fan end bracket, the end bracket having a plurality of tapered air passages defined by a plurality of ramped surfaces and flow ports, the baffle plate comprising:

an annular disk-shaped member having a central shaft aperture therein, and a plurality of tapered scalloped members located about the outer circumference thereof wherein the number of said scallops corresponds to the number of air passage in the end bracket.

2. The baffle plate for a motorized fan assembly according to claim 1, wherein each said scallop is defined by a leading end, a trailing end, and a curvilinear edge connecting said leading end and said trailing end.

3. The baffle plate for a motorized fan assembly according to claim 2, wherein said leading end of one said scallop terminates at the trailing end of an adjacent said scallop.

4. The baffle plate for a motorized fan assembly according to claim 3, wherein said curvilinear edge of each said scallop approximates the profile of said air passages in said end bracket.

5. The baffle plate for a motorized fan assembly according to claim 4, wherein said baffle plate is disposed on the end bracket and thereby defines an effective flow port between said baffle plate and the ramped surface of each air passage, whereby the length of said curvilinear edge determines the size of said effective flow port.

6. In combination, a baffle plate and a fan end bracket which are carried by a motorized fan assembly, the combination comprising:

a fan end bracket having a plurality of tapered air passages defined by a plurality of ramped surfaces and flow parts; and a baffle plate having a flat annular disk-shaped member without transverse projections, said disk-shaped member having a central shaft aperture therein and a plurality of tapered scalloped members located about the outer circumference thereof, wherein said baffle plate is disposed adjacent said fan end bracket in the motorized fan assembly.

7. A motor assembly having a rotating fan member drivingly connected to a rotor member, the rotor member being disposed within a stator assembly, comprising:

a fan end bracket having first and second sides;

a plurality of tapered air passages in said first and second sides, each said air passage having a fixed port aperture therein;

means for mounting the stator assembly on said fan end bracket;

means for shrouding the fan member, said means for shrouding being mateably engagable with said fan end bracket; and, means for selectively providing an effective flow port aperture corresponding to each said air passage, said means for selectively providing being interposed between said fan member and said end bracket.

8. The motor assembly according to claim 7, wherein said means for mounting is a mounting rim located on said second side of said end bracket.

9. The motor assembly according to claim 7, wherein said means for shrouding said fan member is a cup-shaped fan shroud having an inside diameter approximating the outside diameter of said end bracket.

10. The motor assembly according to claim 7, wherein said means for selectively providing an effective port aperture comprises an annular disk shaped baffle plate.

11. The motor assembly according to claim 10, wherein said baffle plate has a central shaft aperture and a plurality of tapered scallops about the circumference thereof, each said tapered scallop having a baffle vane extending therefrom.

12. The motor assembly according to claim 11, wherein the number of said plurality of scallops is equal to the number of air passages in said end bracket.

13. The motor assembly according to claim 10, wherein the diameter of said baffle plate is slightly less than the diameter of said means for shrouding.

14. The motor assembly according to claim 11, wherein each of said scallops has a leading end and a trailing end, and said trailing end of one said scallop terminates at said leading end of an adjacent said scallop.

15. The motor assembly according to claim 14, wherein the distance between said leading end of said scallop and said trailing end of said scallop determines the size of each effective port aperture.

16. A universal fan end bracket assembly for a motorized fan assembly comprising:

an end bracket having
a first side;
a second side opposite said first side;
a cylindrical outer wall between said first side and said second side, said first and second sides having a central shaft aperature therethrough;
a plurality of tapered ramp surfaces radiating outwardly from said central shaft aperture toward said cylindrical outer wall in said first side, said plurality of tapered ramp surfaces defining a plurality of curvilinear air passages;
a flow port in each said air passage;
a motor mounting rim on said second side; and,
a baffle plate having a plurality of curvilinear scallops therein, said baffle plate adapted to be disposed on said first side of said end bracket.

17. The universal fan end bracket assembly according to claim 16, wherein the number of said scallops in said baffle plate corresponds to the number of air passages in said end bracket.

18. The universal fan end bracket assembly according to claim 17, wherein each said scallop is defined by a leading end, a trailing end, and a curvilinear edge connecting said leading end and said trailing end, said leading end of one said scallop terminating at the trailing end of an adjacent said scallop.

19. The universal fan end bracket assembly according to claim 18, wherein said curvilinear edge of said scallops approximates the profile of said air passages in said end bracket.

20. The universal fan end bracket assembly according to claim 19, wherein said baffle plate is disposed on said end bracket and thereby defines an effective flow port between said baffle plate and said ramped surfaces of each said air passage, whereby the length of the curvilinear edge of each said scallop determines the size of said effective flow port.

* * * * *